March 22, 1960    J. H. BUNDY    2,929,186
ROTARY POWER LAWN MOWER GUARD
Filed Nov. 18, 1958

John H. Bundy
INVENTOR.

BY Clarence A. O'Brien
and Harvey B. Jacobson
Attorneys

United States Patent Office 2,929,186
Patented Mar. 22, 1960

2,929,186

ROTARY POWER LAWN MOWER GUARD

John H. Bundy, Lincoln, Nebr.

Application November 18, 1958, Serial No. 774,704

1 Claim. (Cl. 56—25.4)

This invention relates generally to power lawn mowers of the type comprising a cutting blade or disc rotatable in a horizontal plane, and has for its primary object to provide, in a manner as hereinafter set forth, novel means for positively preventing the feet of the user or operator from getting under the machine and being injured by the blade as, for example, when starting the engine, adjusting the carburetor, etc.

Another important object of the present invention is to provide a guard of the character described which is adapted to be mounted readily on the axles of the mower and which, further, is vertically adjustable independently of the machine.

Still another important object of the invention is to provide a guard of the aforementioned character which may be installed for use on conventional power mowers without the necessity of materially altering same structurally.

Other objects of the invention are to provide a rotary power mower guard of the character set forth which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
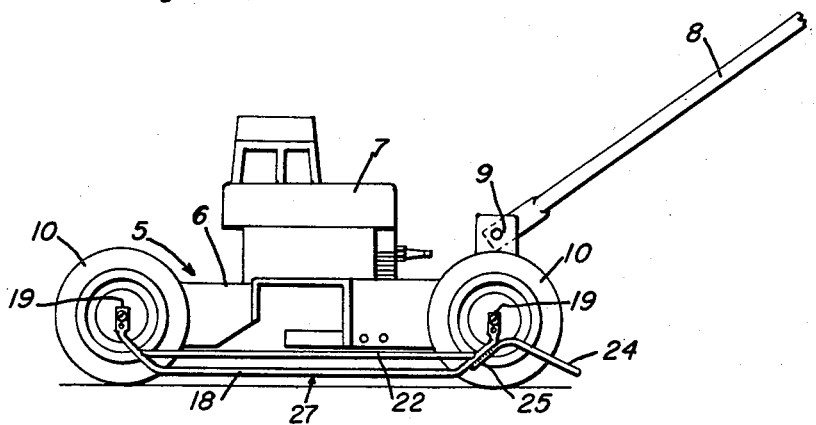
Figure 1 is a view in side elevation of a rotary power lawn mower equipped with a guard constructed in accordance with the present invention.
Figure 2:
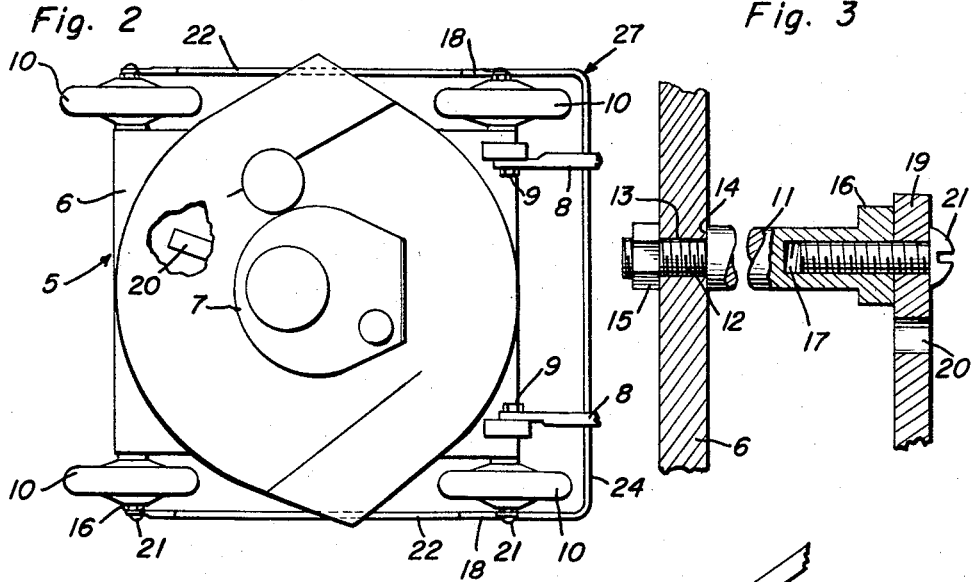
Figure 2 is a view in top plan thereof with a portion of the top of the housing broken away to show the blade.

Referring now to the drawing in detail, it will be seen that reference character 5 designates generally a rotary power mower comprising a hood or housing 6 having mounted thereon a suitable engine 7. The housing 6, as usual, is open at its bottom and said housing encloses a horizontal cutting blade 26 which is driven by the motor 7. A suitable handle 8 is hingedly mounted at 9 for vertical swinging movement on the rear end portion of the housing 6.

Figure 3:
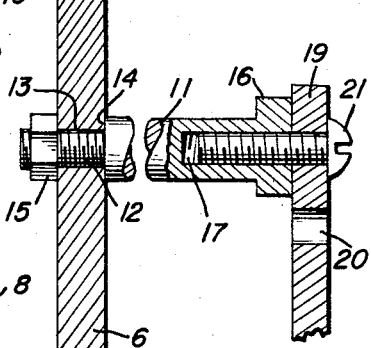
Figure 3 is an enlarged fragmentary view in vertical section through one of the wheel and guard mounts.

Mounted on the corner portions of the housing 6 are supporting wheels 10. The wheels 10 are journaled on axles 11 which project from the sides of the housing 6 adjacent to the ends thereof. As shown to advantage in Figure 3 of the drawing, the axles 11 comprise reduced, threaded inner end portions 12 which are insertable through openings 13 provided therefor in the housing 6. The reduced end portions 12 provide shoulders 14 on the axles 11 which abut the housing 6. Retaining nuts 15 are threaded on the portions 12 of the axles 11. At their outer ends, the axles 11 terminate in wheel retaining heads or flanges 16. Extending longitudinally into the axles 11 from the outer ends thereof are threaded bores or sockets 17.

Figure 4:
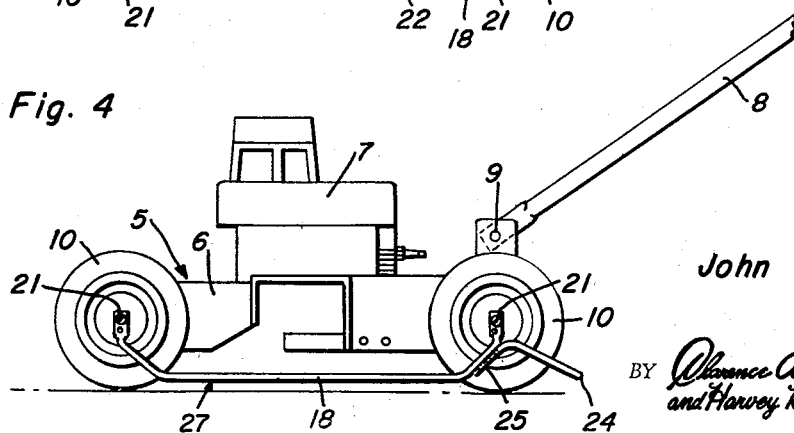
Figure 4 is a side elevational view, showing a slight modification.

Mounted longitudinally on the sides of the mower 5 are rods 18 of aluminum or other suitable metal. The side rods 18 terminate in flattened, upturned end portions 19 having spaced openings 20 therein. Bolts 21 are insertable selectively in the spaced openings 20 and engageable in the bores 17 of the axles 11 for mounting the rods 18 for vertical adjustment on said axles. Extending between the upturned end portions 19 of the rods 18 are supplemental rods 22. As shown in Figure 4 of the drawing, the rods 22 may be dispensed with, if desired. A transverse rod 24 extends around the rear of the machine 5 and terminates in angularly bent end portions which are affixed to the rear end portions of the rods 18, as at 25. The rods 18, 22 and 24 provide a guard 27.

It is thought that the manner in which the guard 27 functions will be readily apparent from a consideration of the foregoing. Briefly, the rods 18 and 24 extend adjacent to the ground substantially in or below the horizontal plane of the bottom of the hood 6 for preventing the feet of the operator from getting under the machine from the rear or either side thereof. Through the medium of the spaced openings 20 in the end portions 19 of the rods 18, the guard 27 may be vertically adjusted as desired independently of the machine. Also, the machine may be adjusted in the usual manner to cut at any desired height without disturbing the guard. When traversing a curb, etc. the longitudinal side rods 18 function as skids or runners for protecting the blade 26 therefrom. The rods 18 may also prevent the machine from "scalping." The construction and arrangement also are such as to interfere in no way with the discharge of the cuttings from the machine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A power lawn mower comprising a housing including depending side walls having openings in the front and rear portions thereof, laterally extending axles on said side walls comprising reduced threaded inner end portions engaged in the openings and providing shoulders abutting said side walls, retaining nuts for the axles threaded on said reduced inner end portions thereof, supporting wheels journaled on the axles, said axles further comprising wheel retaining heads on their outer ends and having threaded bores extending thereinto from said outer ends thereof, a guard comprising longitudinal side rods paralleling the side walls and including upturned end portions having spaced openings therein selectively registerable with the bores, bolts engaged in the bores and the registering last named openings for securing the rods for vertical adjustment on the axles, said guard further comprising a transverse rod extending across the rear of the housing and terminating in angulated end portions affixed to the upturned rear end portions of the side rods for vertical adjustment therewith, and a cutter operable in the housing.

References Cited in the file of this patent

UNITED STATES PATENTS

| | | |
|---|---|---|
| 1,954,579 | Smith | Apr. 10, 1934 |
| 2,167,222 | Shelor | July 25, 1939 |
| 2,489,059 | Surgi | Nov. 22, 1949 |
| 2,514,407 | May | July 11, 1950 |
| 2,651,530 | Blydenburgh | Sept. 8, 1953 |
| 2,760,589 | Rudman | Aug. 28, 1956 |
| 2,870,592 | Swanson | Jan. 27, 1959 |